United States Patent [19]
Brennan

[11] 3,773,381
[45] Nov. 20, 1973

[54] COMPACT TRAY TABLE

[75] Inventor: Edward J. Brennan, Litchfield, Conn.

[73] Assignee: Universal Oil Products Company, Des Plaines, Ill.

[22] Filed: May 8, 1972

[21] Appl. No.: 251,309

[52] U.S. Cl.................. 297/191, 297/163, 108/45
[51] Int. Cl.............................................. A47c 7/62
[58] Field of Search................. 297/191, 163, 164, 297/165, 166, 167, 168, 169; 108/45, 42, 48, 50

[56] References Cited
UNITED STATES PATENTS

| | | | |
|---|---|---|---|
| 3,588,172 | 6/1971 | McGregor | 297/191 |
| 2,771,331 | 11/1956 | Messman | 108/45 |
| 2,719,066 | 9/1955 | Budzinski | 108/45 X |
| 3,606,112 | 9/1971 | Cheshier | 108/45 X |
| 633,399 | 9/1899 | Street et al. | 297/167 |
| 2,270,557 | 1/1942 | Randall | 108/45 |
| 2,597,330 | 5/1952 | Huddleston | 108/45 |

Primary Examiner—James T. McCall
Attorney—James R. Hoatson, Jr. et al.

[57] ABSTRACT

Seat back tray table is pivotally mounted to the frame of a seat, and preferably an aircraft passenger seat, so as to be stowable in a recess in the back of the seat but easily movable to a horizontal use position. The table is formed in two hinged sections including an outer thicker section which is fixed to a pair of side support frame members and an inner thinner section which can be pivoted 180° toward the seat back to be supported by the side support frame members in their horizontal use position. The compact table provides more passenger knee room than non-folding prior art tray tables and also permits the table assembly to be of less weight since the pivoted portion of the table would not be expected to receive the loading applied to the fixed table portion which is more accessible to a seat occupant.

4 Claims, 5 Drawing Figures

PATENTED NOV 20 1973 3,773,381
Figure 1
Figure 2
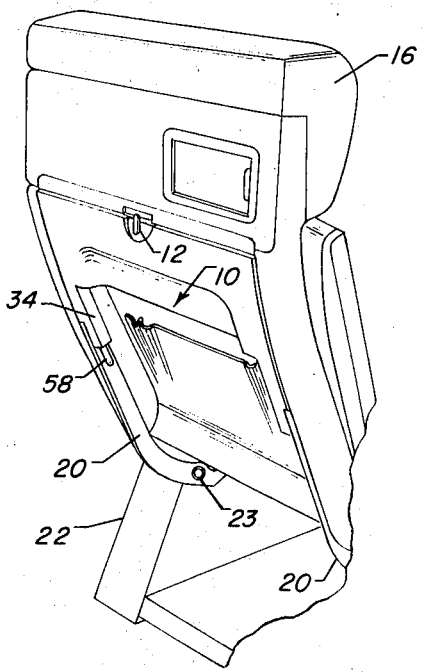
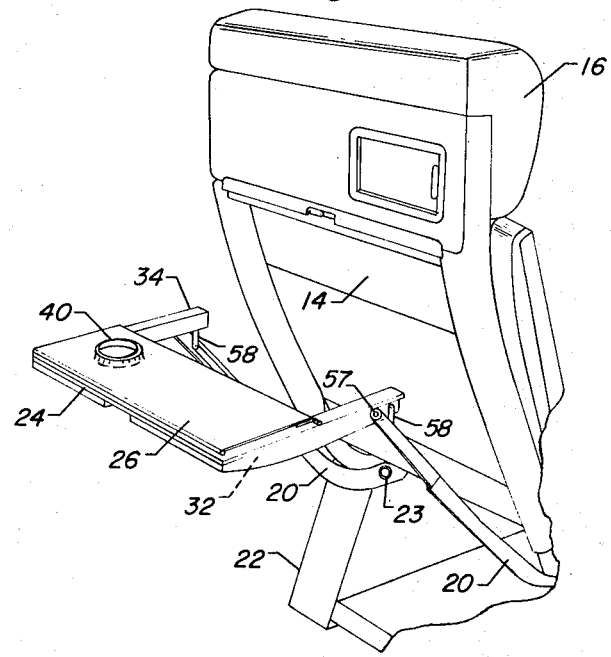
Figure 3
Figure 4
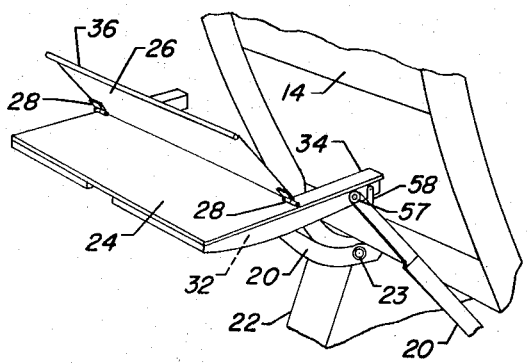
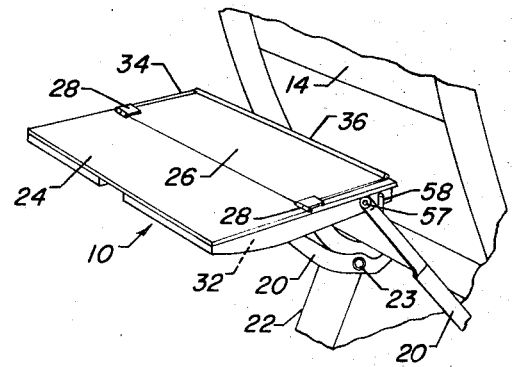
Figure 5
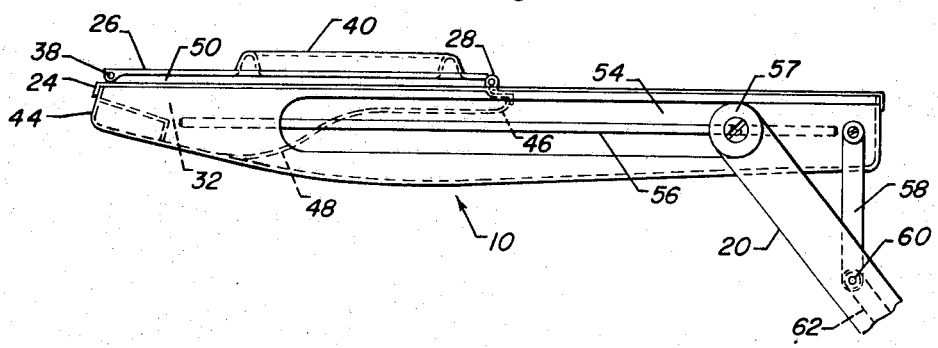

COMPACT TRAY TABLE

BACKGROUND OF THE INVENTION

This invention relates to seat mounted tables and particularly to pivoted tables which are stowable in a recess in the back of an aircraft passenger seat and movable outwardly to a horizontal position where they may be used by a passenger in the seat immediately to the rear to support a food tray. Although tray tables are in universal use, they are generally of such a depth that they must necessarily restrict a seat occupant's knee room or interfere with the use of the seat back pocket. A folding tray table in association with an aircraft seat wherein a relatively narrow width table extension portion pivots upwardly and outwardly toward a user is known, but presents certain problems in that the hinges must prevent the extension from assuming a use position in other than the plane of the fixed portion of the table. The extension and hinges must also be sufficiently strong to bear the sometimes very substantial weight applied to it by a passenger.

SUMMARY

It is an object of this invention to provide a tray table which may be stored in a very small area of the back of a seat, thereby providing additional knee room between a passenger and the seat in front of him and also making more of the area of the rear of the seat available for other uses.

It is an additional object of this invention to provide a folding compact tray table which is light in weight, strong and rigid.

These and other objects are attained by the tray table of the present invention which comprises a pair of table surface members which are pivoted to each other so that when the table is pulled outwardly from its storage position in a seat back into a horizontal position, the table halves will be stacked over one another with their hinges facing the seat back. The upper movable half can then be lifted and pivoted 180° to a position away from the user where its surface is in a common plane with the lower fixed half. Elongated support arms, which are horizontal when the table is in its use position, are fixed to the sides of the lower table half and attached by a pivot linkage to a pair of pivoted support legs which are attached to the lower frame of the seat so as to be unaffected by movement of the seat back to a reclining position.

Since the improved folded tray table takes up only one half the space in a seat back required by a conventional table, the seat back storage pocket will be quite accessible. Also, should the seat be equipped with seat and back cushions which can be moved from their normal position when not occupied so that an occupant in the seat to the rear can place his feet through the rear of the seat, there will be ample room below the stored tray table for the occupant's feet.

BRIEF DESCRIPTION OF THE DRAWINGS

FIG. 1 is a perspective view showing the improved tray table in its storage position in a seat back;

FIG. 2 is a perspective view showing the improved tray table in a horizontal position before it is unfolded;

FIG. 3 is a perspective view showing the improved tray table in an intermediate partially unfolded position;

FIG. 4 is a perspective view showing the improved tray table in a horizontal use position; and FIG. 5 is a side edge plan view of the improved tray table.

DESCRIPTION OF THE PREFERRED EMBODIMENT

The improved tray table indicated generally at 10 is movable from the storage position shown in FIG. 1, through the intermediate positions shown in FIGS. 2 and 3, to the horizontal use position shown in FIG. 4. In its storage position, the table is retained by a latch member 12 in a recess 14 in the back of a seat 16 such as an aircraft passenger seat. The table 10 is supported for pivotal movement between its storage and use positions by a pair of legs 20. Legs 20 are pivoted to the seat frame 22 on the same pivot axis 23 as the seat back so that reclining movement of the seat back will have no effect on the tray table in its use position (FIG. 4).

The table 10 has a rear portion 24 and a front portion 26 which is pivotally attached to it by hinges 28. The rear portion 24 is fixed at its sides to a pair of support arms 32 which include upper support surfaces 34 which support the forward table portion 26 when it is pivoted to its use position. Since most of the table loading, such as the weight of a passenger's arms, is carried by rear table portion 24, the movable forward portion 26 can be formed of a thin very light material such as plastic. To provide rigidity to the folding portion 26 along its unsupported outer longitudinal edge which bridges the distance between the side support surfaces 34, the edge may have a flange or rib 36 formed thereon. For additional strength, an elongated metal member 38 may be molded within the rib 36. If desired, a circular raised portion 40 may be formed on the bottom of the movable portion 26 so that a passenger could use the table in the folded position shown in FIG. 2 to hold a glass and perhaps a snack when the entire table surface was not needed for supporting a metal tray.

The construction of the table 10 can be seen in FIG. 5. The rear portion 24 of the table is quite thick at its outer edge 44 so as to provide greater strength where a passenger is likely to lean on it. The cross-section becomes thinner toward its inner edge 46 so as to provide a passenger with maximum knee room when the table is in its storage position. The rearward table portion 24 is preferably made of foamed in place or injection molded plastic with the lower portion 48 and the upper portion 50 being joined to each other at their peripheral edges by fusing. The lower portions 48 envelope the support arms 32 and cover some of the moving parts therein. The movable table portion 26 is preferably formed of injection molded plastic. Although the table support linkage forms no part of this invention it might be noted that the support arms 32 include an elongated slot 54 in which a rod 56 is mounted. End members 57 on the legs 20 are guided for sliding movement on the rods 56 when the table 10 is tilted upwardly to the same angle as legs 20 (FIG. 1). A pin 60 on the lower end of pivot link 58 is mounted for sliding movement in a slot 62 in the legs 20 as the support arms 32 are moved to their storage position. In FIG. 5, the link 58 is shown at the upper end of its slot 62 so as to form a rigid triangular linkage to support the table 10 in a horizontal position. As the table is moved to its FIG. 1 storage position, the slots 54 are aligned with the legs 20 and slide down over and cover a portion of the length of the legs equal to the length of slot 54.

I claim as my invention:

1. In a seat back tray table having a pair of support legs pivotally mounted at their lower end on a seat frame for limited movement into and out of a recess in the seat back and a pair of support arm members pivotally mounted at their inner ends to the upper ends of each of said support legs for movement from a storage position in a recess in the seat back to a generally horizontal use position, the improvement comprising a first elongated generally flat table portion attached at its ends to the outer end portions of said support arm members, a second elongated generally flat table portion hinged on its inner longitudinal edge to the inner longitudinal edge of said first table portion and adapted to be pivoted 180° forward between a storage position in overlying contact with said first table portion and a use position in overlying contact with the inner end portions of said pair of support arm members, the space between said support frame members which is covered by said second table portion during use being open when said second table portion is in its storage position.

2. The tray table of claim 1 wherein said first table portion is thicker than said second table portion.

3. The tray table of claim 1 wherein said hinge means for hinging said second table portion are mounted on said support frame members.

4. The tray table of claim 1 wherein said second table portion includes retaining means adapted to retain a glass when said table portions are horizontal and in overlying contact with each other.

* * * * *